US010789912B2

(12) United States Patent
Anderson

(10) Patent No.: US 10,789,912 B2
(45) Date of Patent: Sep. 29, 2020

(54) METHODS AND APPARATUS TO CONTROL RENDERING OF DIFFERENT CONTENT FOR DIFFERENT VIEW ANGLES OF A DISPLAY

(71) Applicant: Intel Corporation, Santa Clara, CA (US)

(72) Inventor: Glen J. Anderson, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/228,287

(22) Filed: Dec. 20, 2018

(65) Prior Publication Data
US 2019/0122638 A1 Apr. 25, 2019

(51) Int. Cl.
*G09G 5/14* (2006.01)
*G06F 3/147* (2006.01)
*G09G 5/00* (2006.01)

(52) U.S. Cl.
CPC .............. *G09G 5/14* (2013.01); *G06F 3/147* (2013.01); *G09G 5/003* (2013.01); *G09G 2320/068* (2013.01); *G09G 2340/14* (2013.01); *G09G 2354/00* (2013.01)

(58) Field of Classification Search
CPC .... G09G 5/003; G09G 5/14; G09G 2320/068; G09G 2340/14; G09G 2354/00; G06F 3/147
See application file for complete search history.

(56) References Cited

U.S. PATENT DOCUMENTS

| 10,558,264 | B1* | 2/2020 | Watson | G06F 3/013 |
|---|---|---|---|---|
| 10,613,699 | B2* | 4/2020 | Thompson | G06F 3/013 |
| 2011/0254914 | A1* | 10/2011 | Ng | H04N 21/6587 348/14.16 |
| 2014/0225931 | A1* | 8/2014 | Plagemann | G06T 3/40 345/660 |
| 2014/0327694 | A1* | 11/2014 | Cao | H04N 13/398 345/597 |

(Continued)

OTHER PUBLICATIONS

Lincoln et al., "Multi-view Lenticular Display for Group Teleconferencing", Immerscom 2009, May 27-29, 2009, Berkley, USA, 8 pages.

(Continued)

*Primary Examiner* — Jacinta M Crawford
(74) *Attorney, Agent, or Firm* — Hanley, Flight & Zimmerman, LLC

(57) ABSTRACT

Methods and apparatus to control rendering of different content for different view angles of a display screen are disclosed. An example apparatus includes a position analyzer to: determine a first location of a first person relative to a display screen, and determine a second location of a second person relative to the display screen. The example apparatus includes a position comparer to determine a difference in position between the first person and the second person based on the first and second locations. The example apparatus includes a content determiner to identify first content to display to the first person and second content to display to the second person when the difference satisfies a threshold, and identify third content to display to both the first person and the second person when the difference does not satisfy the threshold.

24 Claims, 9 Drawing Sheets

(56) References Cited

U.S. PATENT DOCUMENTS

| | | | | |
|---|---|---|---|---|
| 2015/0054739 A1* | 2/2015 | Itoh | ............... | G06F 3/013 345/156 |
| 2015/0062314 A1* | 3/2015 | Itoh | ............... | G06F 3/012 348/55 |
| 2015/0358594 A1* | 12/2015 | Marshall | ............... | G06F 3/013 345/419 |
| 2016/0210100 A1* | 7/2016 | Ng | ............... | G06F 3/03 |
| 2016/0219268 A1* | 7/2016 | Strom | ............... | G06F 3/012 |
| 2016/0261837 A1* | 9/2016 | Thompson | ............... | H04N 9/3185 |
| 2017/0205889 A1* | 7/2017 | Ng | ............... | G06F 3/017 |
| 2018/0295353 A1* | 10/2018 | Lee | ............... | H04N 13/271 |
| 2018/0357981 A1* | 12/2018 | Ng | ............... | G09G 5/14 |

OTHER PUBLICATIONS

Misapplied Sciences, "The Parallel Reality Technology", available at http://misappliedsciences.com/Home/Technology, accessed on Nov. 19, 2018, 7 pages.

Szczys, Mike, "Virtual Windows That Track a Viewer's Position", available at https://hackaday.com/2010/04/16/virtual-windows-that-track-a-viewers-position/, Oct. 10, 2018, 10 pages.

\* cited by examiner

METHODS AND APPARATUS TO CONTROL RENDERING OF DIFFERENT CONTENT FOR DIFFERENT VIEW ANGLES OF A DISPLAY

FIELD OF THE DISCLOSURE

This disclosure relates generally to media display devices, and, more particularly, to methods and apparatus to control rendering of different content for different view angles of a display.

BACKGROUND

Technology associated with media display devices is constantly improving. Such technology provides new and improved ways to render content for viewing by people in a viewing area of the display. Beyond improved display technologies, systems have been developed that can monitor people in a viewing area to update or change the rendered content in an interactive manner.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
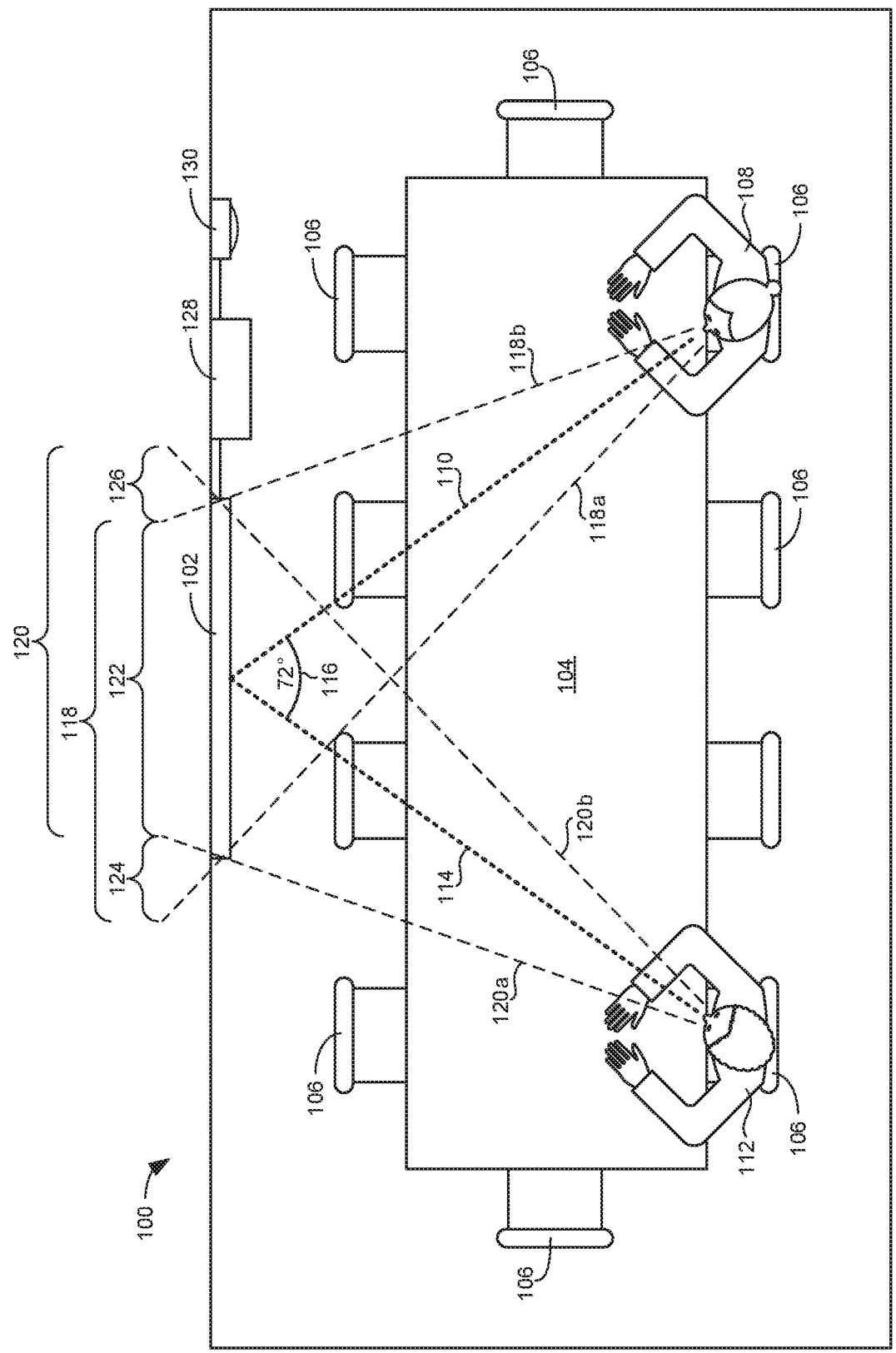
FIGS. 1-4 illustrate different arrangements of people within an example viewing area of an example multi-view display system constructed in accordance with teachings disclosed herein.

The virtual window is a relatively new form of media display technology. A virtual window is a projection or a wall-mounted display that appears to be a real window based on rendered content that produces the effect of a person viewing a scene in the outside world beyond the window. Virtual windows may be beneficial in rooms and/or other locations that either do not have a real window to the outside world and/or have a window that provides an undesirable view (e.g., the side of an adjacent building). Often, the content rendered by virtual windows is more than a mere picture of a view from a window. Rather, virtual windows may include video footage of a real-world scene and/or otherwise animated content (whether replicating the real-world or not) that includes movement (e.g., people and/or animals passing by, waves moving in water, trees blowing in the wind, etc.) to increase the realism of the content mimicking a scene viewed through a real window.

Some prior virtual windows incorporate interactive technology to update the rendered scene based on the position of a person relative to the virtual window. For instance, when a person gets closer to a real window, the field of view of the outside world expands. Thus, some virtual windows increase or decrease the portion of a scene that is rendered based on how close or far a person is to a particular virtual window. Further, some virtual windows are able to reproduce the effect of motion parallax as a person changes their viewing angle of the virtual window by moving parallel to the plane of the virtual window. For example, as a person moves to the left relative to a real window, the person's view of the outside world through the window shifts to the right. Accordingly, some virtual window technology tracks the position of a person to shift the view of a rendered scene based on the persons' position. While such changes or adjustments to rendered content can increase the realism of a virtual window for one person moving within a viewing area of the virtual window, the same changes or adjustments can detract from the realism for other people in the viewing area. In particularly, the other people may be at different positions relative to the virtual window than the first person such that their viewing angle and/or distance from the virtual window would result in a significantly different view of the outside world mimicked by the virtual world. Furthermore, while the first person may be moving relative to the virtual window such that the portion of the rendered scene is constantly changing, such changes to the rendered scene would not appear real to others that were not similarly moving. One solution to this problem would be for the separate people to wear individual head-mounted gear (e.g., an augmented reality display, stereoscopic glasses, etc.) to individualize the content viewed by each person. However, people often do not like to wear head-mounted gear. Furthermore, wearing such gear undermines the effect of realism intended by virtual windows.

Examples disclosed herein overcome the above deficiencies of known virtual windows, without using head-mounted gear, by implementing a multi-view display system. As used herein, a multi-view display system includes one or more media display devices capable of rendering different content for different viewing angles simultaneously.

One known type of multi-view display that enables different content to be viewed simultaneously by multiple different people at different angles involves the use of a lenticular lens display. A lenticular lens display is implemented by overlaying any suitable type of display (e.g., LCD, LED, plasma, etc.) with a lenticular surface containing an array of convex lens. By arranging individual lenses of the lenticular surface relative to individual pixels of the underlying display, the lenticular surface directs light from the individual pixels in restricted directions. As a result, depending upon where a person is located relative to the display, the person will perceive only the light from pixels directed toward the person. Thus, multiple people positioned with differing view angles of the display may simultaneously be presented different content rendered on the display because each person perceives the light from only a subset of the pixels directed toward each person via the lenticular surface.

Another known type of multi-view display that can provide different content simultaneously to different people involves the use of a parallax barrier display. A parallax barrier display is implemented by placing a parallax barrier in front of any suitable type of display (e.g., LCD, LED, plasma, etc.). A parallax barrier is an opaque layer that includes a series of precisely positioned small openings (e.g., slits, holes, etc.). The opaque barrier prevents a person from seeing light from any pixels other than those visible through the openings. As a person moves to a different view angle of the display, the person will be able to see the light from different pixels of the display. Accordingly, multiple people positioned with differing view angles of the display may simultaneously be presented different content rendered on the display because each person perceives the light from only a subset of the pixels of the display that are visible through the openings in the parallax barrier.

A multi-view retroreflective display is another known type of multi-view display that can render different content for multiple different people simultaneously via a single display screen. A multi-view retroreflective display is implemented by a retroreflective surface as the display screen and by positioning separate projectors in substantial alignment with the view angle of each person of a display screen to which the separate projectors render content. A retroreflective surface has the property of reflecting light back to its source with relatively little scattering of the light. Thus, the light projected by a first projector aligned with a first person will be reflected back to the first person without interfering with the light projected from a second projector that is reflected back to a second person. In this manner, multiple people with differing view angles of a retroreflective display screen may simultaneously be presented different content based on what is projected from the different projectors aligned with different ones of the people.

Another known type of multi-view display that can provide different content for different view angles via a single display involves an array of projectors that are precisely controlled using an advanced optical design to simultaneously produce multiple beams of directional light for individual pixels of the display with different colors and/or different intensities of brightness. In this manner, rather than limiting different people's views to different subsets of pixels to control what content each person sees (as with the lenticular lens approach and the parallax barrier approach above), different people view light from all pixels but the color and intensity of the light may change depending on their angle of view of the display. A display that is capable of directing multiple beams of controlled light for a single pixel simultaneously in controlled directions in this manner is referred to herein as a parallel projector multi-view display.

Using any one or more (or all) of the above described technologies for multi-view displays, examples disclosed herein monitor and/or track the number and location of people within a viewing area of a display screen to then select suitable content to be rendered for different ones of the people based on their positions relative to one another and relative to the screen. For instance, some disclosed examples determine a difference in view angle between two people and compare the difference to a threshold. If the difference does not satisfy (e.g., is less than) the threshold, some examples determine that the two people are too close together to be shown different content that dynamically updates based on their respective positions. In some such examples, the content rendered for the two people may be switched to a common, static view. As used herein, a static view for rendered content refers to content that is not dynamically updated in response to the position, movement, and/or actions of a particular viewer. Thus, a static view is not necessarily a still image, as it may include animation and/or motion, but the animation or motion would appear the same to all individuals viewing the display for their position(s) associated with the static view (e.g., in a similar manner as if the individuals were viewing the content on a traditional media display device). If, on the other hand, the difference in view angle between the two people satisfies (e.g., is equal to or greater than) the threshold, examples disclosed herein render first content for one person and second content for the second person, where the first and second content are different. In some examples, a similar analysis may be performed based on other measurements of a difference in position between two people without specifically calculating the difference in view angle between the people. For instance, in some examples, a difference in position may be based on a distance between the people as determined in three-dimensional space and/or as determined within a two-dimensional representation of the people within an image capturing both of the people.

In some examples, the amount of difference in the first and second content rendered for the two people depends on the difference in position between the people (e.g., as determined based on the distance between the people, the difference in view angle between the people, and/or any other suitable metric). For instance, a static view may be rendered for two people that are very close together, different, partially dynamic views may be rendered for the two people if they are farther apart, and different, fully dynamic views may be rendered for the two people when they are even farther apart. As used herein, a partially dynamic view for rendered content refers to content that is dynamically updated in response to the position, movement, and/or actions of a particular viewer but that includes content that is similar or related to content rendered for another person viewing the same display from a position within a threshold distance of the particular viewer. The similarity in content between partially dynamic views provided to separate individuals is such that the partially dynamic view of one person will not be disruptive to the partially dynamic view of the other person, even if some of the light associated with each partially dynamic view is perceived by the other (unintended) viewer. As used herein, a fully dynamic view for rendered content refers to content that is unlikely to be perceived by an unintended viewer spaced more than a threshold distance apart from the intended viewer. In such situations, the rendered content for one fully dynamic view may be completely independent of the content rendered for a different fully dynamic view (or a different partially dynamic view or a different static view).

Further, some examples disclosed herein determine the context of the viewing area of a display and/or the people in the viewing area to appropriately update and/or change the content rendered for one or more of the people. For instance, in some examples, whether a person in the viewing area is facing the display may be determined to either include or disregard the person as a viewer of the display when assessing the total number of people viewing the display and their relative locations to the display.

In some examples, the activity of the people may be determined to anticipate their movement to update the content that is rendered via the display for different viewing angles. For example, if it is determined that the people are dancing or otherwise moving around the room relatively continuously, examples disclosed herein may determine to render a static view for all viewing angles so as to not have to repeatedly switch views as people move and repeatedly approach and move away from one another and/or change places. Other aspects of examples disclosed herein, and their associated advantages, will be apparent in light of the following detailed description and the accompanying figures.

FIG. 1 illustrates an example viewing area 100 for a multi-view display 102 capable of rendering different content for different viewing angles simultaneously in accordance with teachings disclosed herein. In the illustrated example of FIG. 1, the viewing area 100 corresponds to a conference room including a conference room table 104 surrounded by a plurality of chairs 106. However, teachings disclosed herein may be suitably adapted to any type of viewing area where a display may be located such as, for example, a theater, a stadium, a gymnasium, a store, a room in a home, a restaurant, a bar, an outdoor area, etc. While a single display 102 is shown in FIG. 1, more than one display may be implemented in the viewing area 100 in accordance with teachings disclosed herein.

As shown in the illustrated example of FIG. 1, a first person 108 is sitting in one of the chairs 106 that provides a first view angle 110 of the display 102 and a second person 112 is sitting in a different one of the chairs 106 that provides a second view angle 114 of the display 102. In this example, a difference in view angle 116 of the display between the two persons 108, 112 is approximately 72 degrees due to the relative spacing of the two persons 108, 112 and the display 102. As used herein, view angle of a display (also referred to as an angle of view of the display) corresponds to the angle of a direction extending from the face of a person to a center point of the display screen of the display 102. The view angle may be defined with reference to any suitable reference point. For example, the view angle may be determined relative to a direction normal to the surface of the display 102. In other examples, the view angle may be determined relative to a direction lying in the plane of the surface of the display 102. Further, in some examples, the view angle may be determined as a projection on a horizontal plane such that the vertical positioning of a person relative to the display 102 is ignored. For example, in the illustrated examples of FIG. 1, both the first and second persons 108, 112 are sitting in chairs such that their heads are at approximately the same height. In some examples, the view angle for a particular person may be analyzed the same as if the person were to stand up. In other examples, the view angle determined for a particular person may vary depending on the vertical position of the person relative to the display 102. Further, in some examples, the horizontal position and the vertical position of a person relative to the display 102 may be defined based on two separate view angles.

The relative position of the first and second persons 108, 112 may be defined in other manners independent of their corresponding view angles 110, 114. For example, the distance between the two persons 108, 112 and their distance from the display 102 may similarly be used to define their positions relative to the display 102. Thus, in some examples, measurements other than view angle may additionally or alternatively be used in accordance with teachings disclosed herein. In some examples, the particular metrics used to define and/or determine the position of people relative to one another and relative to the display depends on the types of sensor data available to detect, monitor, and/or track people in the viewing area 100. However, for the sake of brevity, the following discussion is provided with reference to the view angles and the corresponding differences in view angles as noted above.

For purposes of explanation, assume for the moment that the display 102 is a window through which the persons 108, 112 could view an exterior area (e.g., the world outside the room of FIG. 1). What the two persons would perceive through the window would be different because they would be looking through the window from different perspectives. As demonstrated by the long dashed lines 118a, 118b, 120a, 120b shown in the illustrated example of FIG. 1, the first person 108 would have a first field of view 118 (demarcated by the first set of dashed lines 118a, 118b) of the exterior area that is offset relative to a second field of view 120 (demarcated by the first set of dashed lines 120a, 120b) of the second person 112. While both the first field of view 118 and the second field of view 120 include an overlapping portion 122, the first field of view 118 includes a first distinct portion 124 on one side of the overlapping portion 122 and the second field of view includes a second distinct portion 126 on an opposite side of the overlapping portion 122. As a result, to produce the first field of view 118 for the first person 108 on a display (e.g., the display 102 implemented as a virtual window) involves rendering different content than what would be rendered via the same display to produce the second field of view 120 for the second person 112. Traditional media display devices are not capable of rendering different content simultaneously to provide a proper view to both of the persons 108, 112. To overcome this limitation, in the illustrated example, the display 102 is a multi-view display that is capable of rendering different content for different view angles at the same time. The multi-view functionality of the display 102 may be implemented in any suitable matter.

As mentioned above, there are a number of known techniques to implement multi-view displays capable of rendering different content for different individuals at a single point in time via a single screen. However, many implementations of such technologies are not able to dynamically adjust the content that is rendered based on changes in the number and/or position of people within an associated viewing area. That is, while known techniques may be implemented to construct a multi-view display that can render distinct content viewable by the two persons 108, 112 when they are in the particular locations shown in FIG. 1, there is currently no way to automatically adjust the content rendered via the display 102 if one of the persons 108, 112 was to stand up and move to a different chair 106 and/or if the persons 108, 112 were to be joined by one or more additional people.

Examples disclosed herein overcome the above challenges by implementing a display controller 128 that controls the content rendered via the display 102 based on input from one or more sensors 130 monitoring the viewing area 100. In some examples, the one or more sensors 130 include an image sensor to capture images and/or video (e.g., a stream of images) of the viewing area 100. In some such examples, the image sensor includes a wide angle (e.g., fisheye) lens to capture substantially all of the viewing area 100 from a single vantage point. In other examples, multiple image sensors are located at different locations of the viewing area 100. In some examples, the one or more sensors 130 may include other types of sensors to detect and track people in the viewing area 100. For example, the one or more sensors 130 may wirelessly detect transmitters carried by respective ones of the persons 108, 112. Although the display 102, the display controller 128, and the one or more sensors 130 are shown as separate components, in some examples, one or more of the display 102, the display controller 128, and the one or more sensors 130 may be integrated into a single device. Additionally or alternatively, a single display controller 128 may control one or more displays 102, which may be associated with the same viewing area 100 or different viewing areas.

In the illustrated example, the display controller 128 analyzes sensor data provided by the one or more sensors 130 to detect the presence of people in the viewing area 100. Further, in some examples, the display controller 128 may analyze the sensor data to determine position(s) of the people detected in the viewing area 100. As used herein, the position of a person includes the location of the person within the viewing area 100 (e.g., relative to the display 102 (or a different reference point)) as well as the orientation of the person's body (e.g., whether the person is sitting, standing, or lying down, the direction in which the person is facing, etc.). In some examples, the display controller 128 may analyze the image data to determine a direction of gaze of the people. In some examples, the gaze of a person may be determined based on the person's position (e.g., body orientation). Additionally or alternatively, the display controller 128 may implement eye-tracking techniques to more precisely determine the gaze of a person apart from their body orientation. In some examples, the display controller 128 uses the detected presence, position, and/or gaze of people within the viewing area 100 to determine corresponding view angles of the display 102 associated with respective ones of the detected people. The different view angles and/or any other suitable factors may be analyzed to determine whether the detected people are positioned so as to indicate simultaneous rendering of different content via the display 102 for different ones of the detected people is appropriate.

For instance, in some examples, the display controller 128 determines whether a difference in view angle between two individuals (e.g., the two persons 108, 112 of FIG. 1) satisfies a threshold. If the difference does not satisfy the threshold, the display controller 128 may determine that the persons 108, 112 are too close together to render distinct content that would not interfere with the perspective of the unintended person. In such situations, the display controller 128 may cause the display 102 to render a single static view (e.g., similar to a traditional media display device) for viewing by both persons 108, 112. By contrast, if the difference in view angle satisfies the threshold, the display controller 128 may determine that the persons 108, 112 are sufficiently spaced apart to render distinct content for each person. In some examples, the threshold depends on the particular multi-view display technology used to render the different content simultaneously and the associated resolution of the different content. For example, as mentioned above, a parallax barrier display limits the light emanating from individual pixels of the display in specific directions by blocking the light in other directions with a parallax barrier. Thus, two people sitting side-by-side, may be sufficiently close together to perceive light from the same pixels based on the design of the parallax barrier and its position relative to the underlying display screen. The particular distance that must separate two people so that they perceive light from different pixels and, thus, may perceive different content rendered by the different pixels, may be used to define the threshold noted above. A lenticular lens display also directs light from pixels in certain limited directions such that there are particular ranges (associated with the above-referenced threshold) within which two people may be spaced and perceive the same light from the same pixels.

By contrast, the threshold for the difference of angle between two people viewing a rendering via a retroreflective display depends on how precisely the display reflects the light from respective projectors back to its source and how closely each person is positioned to a corresponding projector. The threshold for the difference of angle between two people viewing a rendering via a parallel multi-view display depends on the number of independently controlled light beams that may be emitted for each pixel of the display and the precision with which the direction of such beams may be controlled.

In some examples, the amount and/or level of difference between the content rendered for different people depends on the difference in view angle between the different people falls relative to multiple different thresholds. For example, if the difference in view angle between two people does not satisfy a first threshold, a static (e.g., common) view for both people may be rendered. If the two people are spaced sufficiently apart such that the difference in their view angle satisfies the first threshold but does not satisfy a second, greater threshold, content rendered for one person may be similar to content rendered for the other person but allow for some dynamic variation in the content responsive to detected movement of the person intended to perceive the content (e.g., partially dynamic views). In some examples, the content for both people may be a similar but different view of a common scene. For example, the rendered content may be a scene selected to have a substantially uniform appearance (e.g., a view of the sky) such that differences in the content viewed from the two perspectives would not be disruptive to one another. In some examples, the differences in the content may be selected based on whether the differences in position between the two people is one of distance from the display screen, angular separation relative to the display screen, or both. Further, if the difference in view angle satisfies the second threshold, the content for one person may be rendered entirely independent of the content rendered for the second person. That is, in some examples, the content rendered for each person may correspond to the same scene but be fully dynamic to respond in an interactive manner to the corresponding person. In other examples, the content rendered for each person may be associated with different scenes that are completely independent of one another.

In some examples, the thresholds described above may be zero such that different content may be rendered as a fully dynamic view for two different people regardless of how close they are to one another. However, for purposes of explanation, assume that a first threshold defining the range within which two individuals are provided a static view of common content via the display 102 of FIG. 1 is 25 degrees and that a second threshold defining the range beyond which two individuals are sufficiently far apart to be provided fully dynamic views of independent content is 40 degrees. Thus, in this example, when the difference of view angle between two individuals is between the first and second thresholds (e.g., 25 and 40 degrees), partially dynamic views of similar but different content may be rendered for each of the individuals. Accordingly, in the illustrated example of FIG. 1, first content is rendered for the first person 108 and second, different content is rendered for the second person 112. More particularly, the content rendered for both first and second persons 108, 112 may be fully dynamic and/or independent of each other because the difference in view angle 116 (72 degrees in the illustrated example) between the two persons 108, 112 is greater than the second threshold of 40 degrees. In some examples, the content rendered for the first person 108 corresponds to the first field of view 118 of an exterior area while the content rendered for the second person 112 corresponds to the second field of view 120 of the exterior area, thereby implementing the display 102 as a virtual window perceived by multiple different people simultaneously.

Inasmuch as the content rendered for the first and second persons 108, 112 is independent of each other, the different content does not need to be different views of the same exterior area. Instead, different exterior areas may be presented to different viewers. For instance, in some examples, the content rendered for the first person 108 corresponds to a field of view of a first type of exterior area (e.g., a forest scene) while the content rendered for the second person 112 corresponds to a completely different type of exterior area (e.g., an ocean scene). Further, the display 102 is not limited to being used as a virtual window that mimics views of the outside world but may instead render any type of content. For example, the content may be a slide presentation given by the first person 108 to the second person 112. In some examples, the content rendered for the first person 108 may include the slide presentation with additional notes on screen to assist the first person 108 in giving the presentation. By contrast, the additional notes may be omitted in the version of the presentation simultaneously rendered via the display 102 for the second person 112. Any other type(s) of content may be rendered for the first and second person 108, 112 simultaneously in accordance with teachings disclosed herein.

Figure 2:
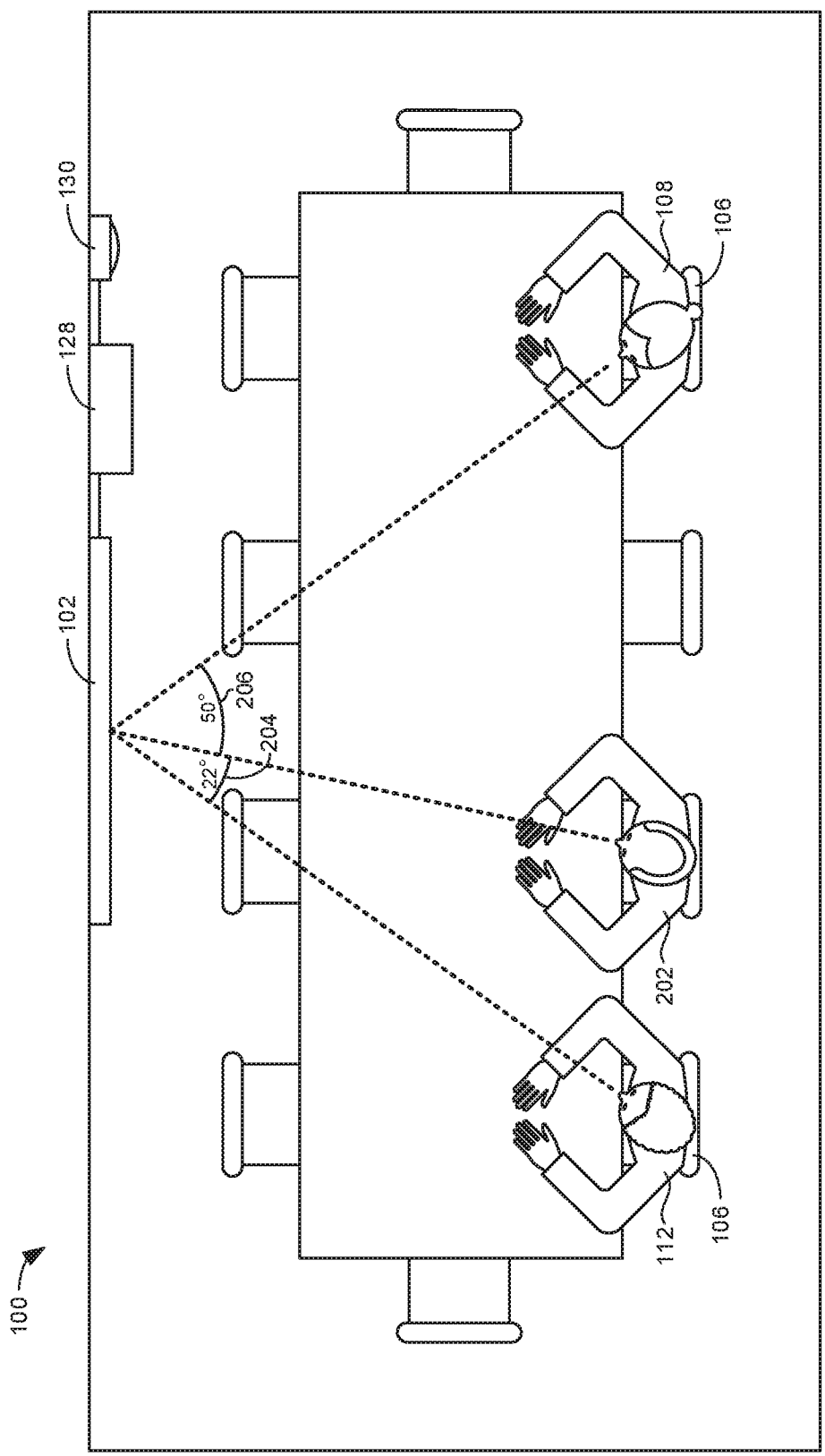

In the illustrated example of FIG. 2, a third person 202 is positioned in the chair 106 next to the second person 112. As shown in the illustrated example, a difference in view angle 204 between the second person 112 and the third person 202 is 22 degrees. Inasmuch as 22 degrees is less than the 25 degree threshold, noted in the example above, the example display controller 128 may determine it appropriate to render a static view of content for both the second person 112 and the third person 202. In other words, the second and third persons 112, 202 are grouped together and treated as a unit for purposes of determining the content to be rendered for all members of the group. However, as noted in the illustrated example, a difference in view angle 206 between the first person 108 and the third person 202 is 50 degrees, which is above the second threshold of 40 degrees. Accordingly, the content rendered for the first person 108 may still be fully dynamic and independent of the content rendered for the second and third persons 112, 202.

Figure 3:
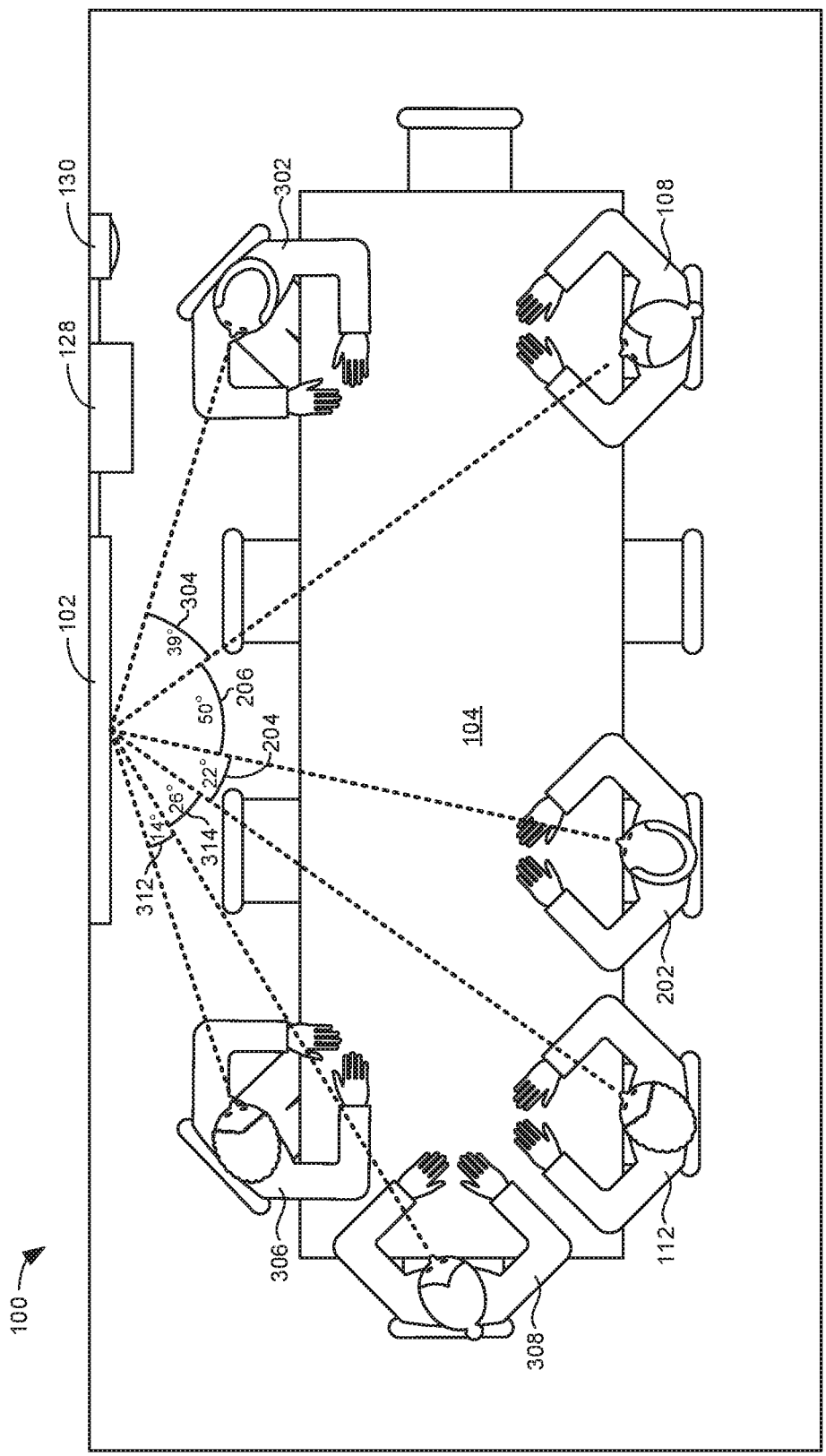

In the illustrated example of FIG. 3, a fourth person 302 is positioned at the table 104 across from the first person 108. As shown in the illustrated example, a difference in view angle 304 between the first person 108 and the fourth person 302 is 39 degrees. Thus, the difference in view angle 304 satisfies (e.g., is equal to or greater than) the first threshold of 25 degrees, but does not satisfy (e.g., is less than) the second threshold of 39 degrees. In such examples, the display controller 128 may identify content to render as partially dynamic views of different but related content for the first and fourth persons 108, 302.

Further, in the illustrated example of FIG. 3, fifth and sixth persons 306, 308 are sitting at the table 104 next the second person 112 opposite the third person 202. As shown in FIG. 3, a difference in view angle 312 between the fifth and sixth persons 306, 308 is 14 degrees, and a difference in view angle 314 between the second and sixth persons 112, 308 is 26 degrees. Thus, as with the difference in view angle 204 between the second and third persons 112, 202, the differences in view angle 312 between the fifth and sixth persons 306, 308 is less than the first threshold of 25 degrees such that the display controller 128 may determine that the fifth and sixth persons 306, 308 are to be combined into a group in the same manner that the second and third persons 112, 202 were combined, as described above, with the content rendered for each group corresponding to a static view. In the illustrated example, the difference in view angle between the two groups corresponds to the difference between the second and sixth persons 112, 308, which is 26 degrees. This difference in view angle is greater than the first threshold (e.g., 25 degrees) but less than the second threshold (e.g., 40 degrees). However, the second and sixth persons 112, 308 cannot be provided partially dynamic views of rendered content in this circumstance because they are already grouped in a manner that the content rendered for each of them is determined to be a static view. Accordingly, in some examples, the display controller 128 may combine all of the second, third, fifth, and sixth persons 112, 202, 306, 308 into a single group that is provided a static view of rendered content. That is, in some examples, when analyzing the difference in view angles between a group of two or more people and another person (or group of people), the first (lower) threshold is ignored such that the content rendered for the individuals involved is either a static view when the difference does not satisfy the second threshold (regardless of whether the first threshold is satisfied) or a fully dynamic view when the second threshold is satisfied. Put another way, while some people may be spaced relatively far apart such that a difference in view angle between them satisfy the second threshold, in some examples, fully dynamic views for such individuals may not be suitable because of other people situated between them that are within a threshold distance from one or both of the two people. Thus, in some examples, the difference in position (e.g., difference in view angle) between the two closest/adjacent people is to control the selection of content for rendering via the display for an associated group of people.

As mentioned above, in some examples, the display controller 128 may consider other factors in addition to or instead of the difference of view angles between the people in the viewing area 100 to determine the content to be rendered for respective ones of the people. For example, the display controller 128 may analyze sensor data from the one or more sensors 130 to determine a direction of gaze of the people in the viewing area 100. In some examples, this involves monitoring the movement of the eyes of the people in the area. In other examples, a higher level analysis is performed to determine the general direction in which a person's head is facing (without analyzing specific eye movements of individuals). If a particular person is not facing towards the display 102, the person may be excluded as a viewer for which content is to be rendered via the display.

Figure 4:
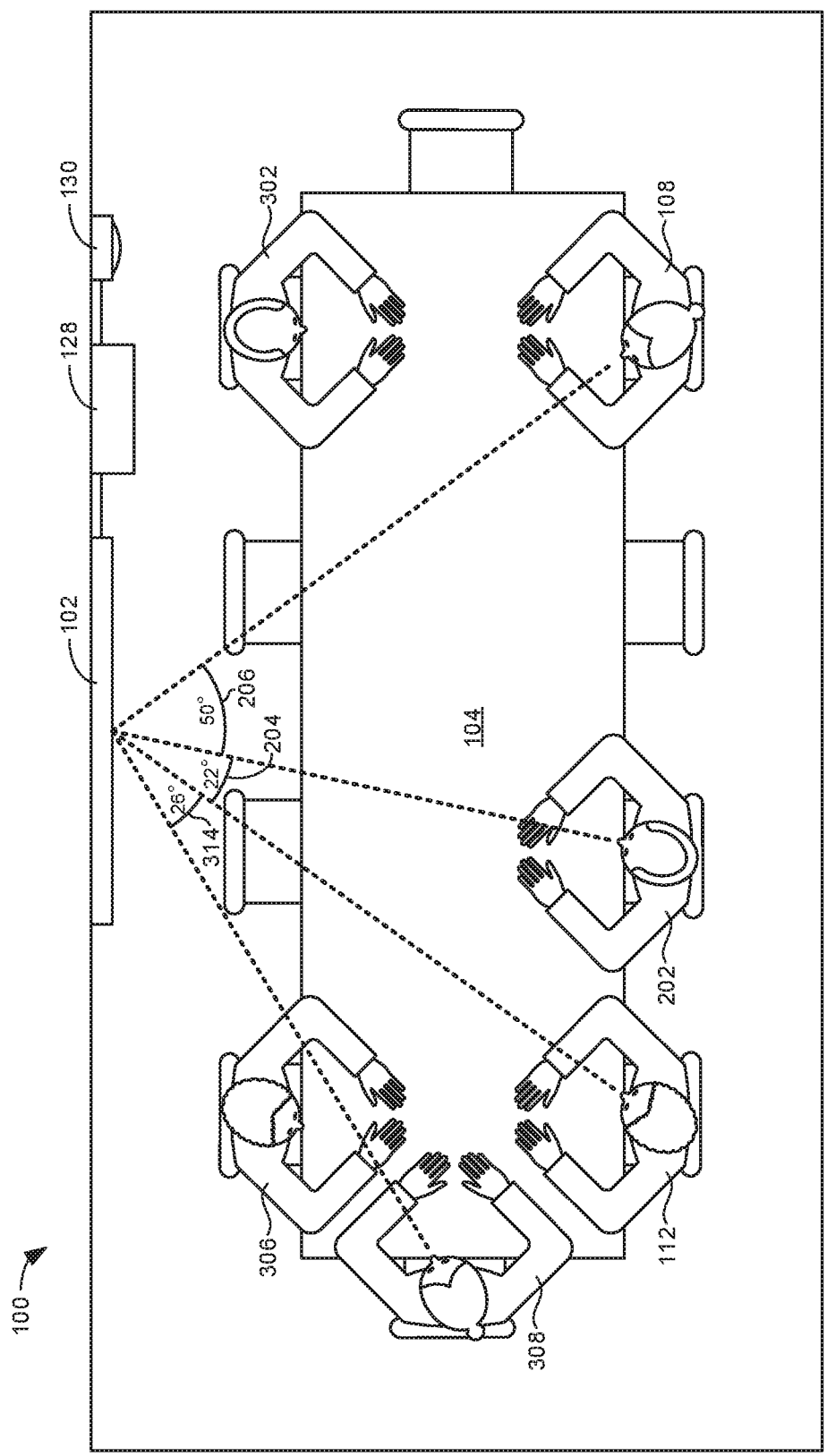

For instance, in the illustrated example FIG. 4, the same six persons 108, 112, 202, 302, 306, 308 shown in FIG. 3 are positioned in the same chairs around the table 104 in FIG. 4. However, in FIG. 4, the fourth and fifth persons 302, 306 are no longer facing towards the display 102, but are facing away from the display 102 towards the other people in the viewing area 100. Accordingly, in some examples, the display controller 128 does not consider the position and corresponding view angles of the fourth and fifth persons 302, 306 when identifying content for display. As a result, the content rendered for the first person 108 may be a fully dynamic view because the nearest person adjacent the first person 108 that is facing the display 102 is the third person 202, who is spaced apart from the first person 108 by more than the second threshold difference of 40 degrees. The fifth person 306 is no longer considered within the first threshold distance of the sixth person 308 (or anyone else) because the fifth person 306 is no longer facing the display 102. However, the sixth person is still within the second threshold angle (e.g., 40 degree) of the second person 112, who is within the first threshold distance (e.g., 25 degree) of the third person 202. As such, in some examples, the sixth person is still grouped with the second and third persons 112, 202 such that all three are provided with a common static view of content rendered via the display 102.

Either or both of the fourth and fifth persons 302, 306, shown facing away from the display 102 in FIG. 4, may turn to face the display 102 again (as shown in FIG. 3). Accordingly, in some examples, the display controller 128 may monitor the movement of the people and exclude those facing away from the display only if they remain facing away for at least a threshold period of time (e.g., 5 seconds, 10 seconds, 30 seconds, etc.). In this manner, the content rendered via the display 102 is not repeatedly switching between fully dynamic, partially dynamic, and/or static views when one or more people in the viewing area 100 is repeatedly turning towards and away from the display 102. Furthermore, in some examples, the display controller 128 performs contextual analysis of the viewing area 100 and/or the people within the viewing area to adjust and/or predict how the content is to be rendered via the display 102 to improve the viewing experience of the people that are present. For example, the display controller 128 may determine that the activity of the people involves relatively frequently turning towards and away from the display 102 and/or significant movement of the people around the viewing area 100. As a specific example, the people may be dancing. In such examples, the display controller 128 may determine, based on the context, to adjust (e.g., increase) the threshold period of time that a person is to be looking away from the display 102 before the rendered content is updated. In other examples, the display controller 128 may determine to render a static view for all view angles regardless of the particular position of people at any given point in time and/or the duration they have been facing away from or towards the display 102.

As another example, the display controller 128 may determine from the context that one of the people in the viewing area 100 is asleep (e.g., is lying on a couch and hasn't moved for a threshold period of time). In some such examples, the display controller 128 may exclude the person from being considered as a viewer of the display 102 (similar to a person facing away from the display 102) even if the sleeping person is facing the display 102.

In some examples, the context or nature of the viewing area 100 itself may be considered by the display controller 128 in determining the content to be rendered via the display 102. For example, if the display includes a pillar, a plant, and/or other object that blocks a view of the display from a certain location, the display controller 128 may exclude a person from being considered as a viewer of the display 102 when in the location where a view of the display 102 is blocked.

In some examples, the display controller 128 may implement machine learning to improve the viewing experience of people in the viewing area 100 over time. In some such examples, the display controller 128 may improve the control of the display 102 based on feedback from users of the display (e.g., the people in the viewing area 100). The feedback may be obtained from users in any suitable matter. In some examples, the feedback is obtained in substantially real-time. For example, a person may provide verbal commands (detected by a microphone associated with the one or more sensors 130) that direct the display controller 128 to update or change the content rendered via the display 102. By analyzing (a) these commands, (b) the associated content being rendered via the display 102, and/or (c) the number and position of people in the viewing area 100 with a neural network, the display controller 128 may improve its ability to identify the context and suitable content that provides a positive viewing experience for people in the viewing area 100 in different situations.

Figure 5:
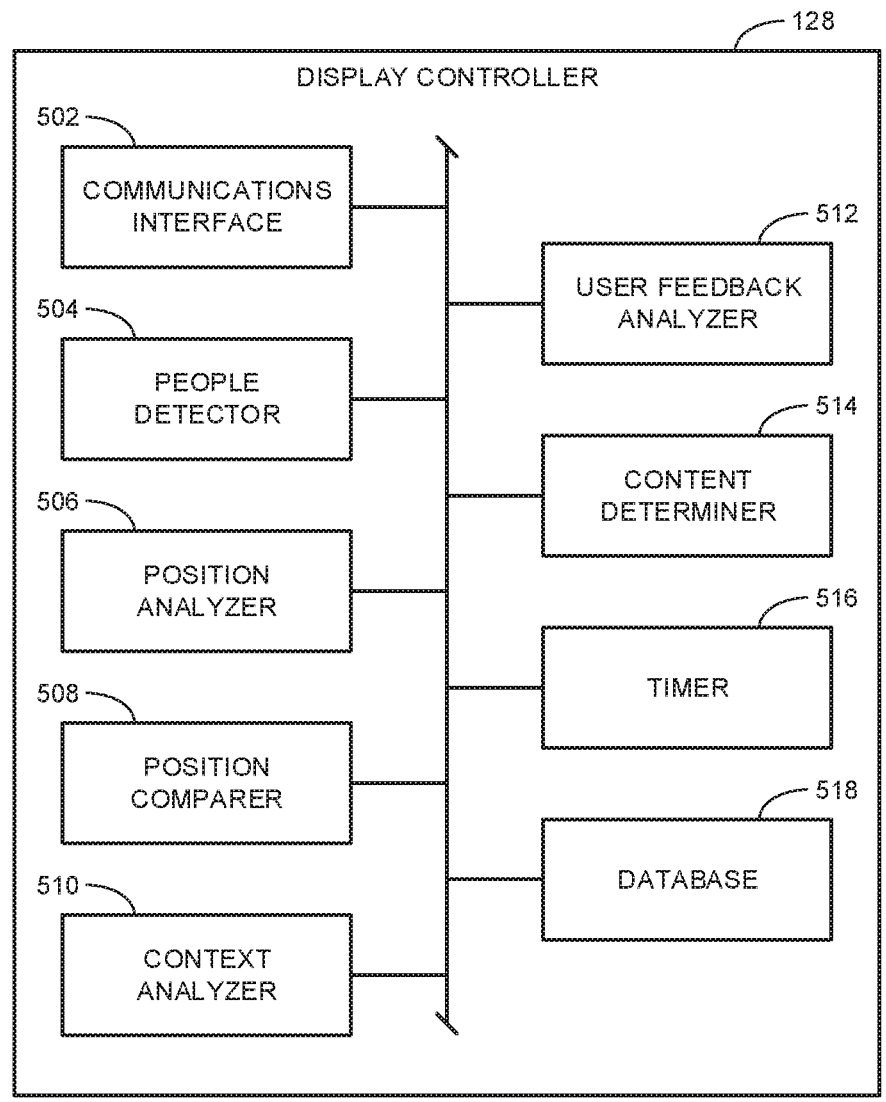
FIG. 5 is a block diagram illustrating an example implementation of the example display controller of FIGS. 1-4.

FIG. 5 is a block diagram illustrating an example implementation of the display controller 128 of FIGS. 1-4. As shown in the illustrated example, the display controller 128 includes an example communications interface 502, an example people detector 504, an example position analyzer 506, an example position comparer 508, an example context analyzer 510, an example user feedback analyzer 512, an example content determiner 514, an example timer 516, and an example database 518.

The example communications interface 502 interfaces with the display 102 to provide content to be rendered via the display and view angle information to enable the display 102 to render the proper content for different view angles of the display. Further, the example communications interface 502 interfaces with the one or more sensors 130 to receive sensor data (e.g., images, video streams, captured audio, depth information, etc.) that may be analyzed and/or processed by at least one of the people detector 504, the position analyzer 506, the position comparer 508, the context analyzer 510, and/or the user feedback analyzer 512.

The example people detector 504 analyzes sensor data, such as images of the viewing area 100, to identify and/or detect the presence of people within the viewing area 100. The example position analyzer 506 analyzes the sensor data to determine the position of the people in the viewing area 100 detected by the people detector 504. As mentioned above, the position of a person includes the location of the person within the viewing area 100 (e.g., relative to the display 102 (or a different reference point)) as well as the orientation of the person's body (e.g., whether the person is sitting, standing, or lying down, the direction in which the person is facing, etc.). In some examples, the position of people within the viewing area 100 is defined with respect to a two- or three-dimensional model of the viewing area 100 stored in the database 518. In some examples, the position analyzer 506 determines an angle of view (also referred to as "view angle") of the display for the detected people. In some examples, the people detector 504 and/or the position analyzer 506 detects people and/or determines their position via one or more computer vision systems.

Based on the position of the detected people determined by the position analyzer 506, the example position comparer 508 compares the position of the people to one another to determine a difference in position between different ones of the people. More particularly, in some examples, the position comparer 508 determines difference in position between different ones of the people detected in the viewing area 100 based on differences in view angles between the people. As noted above, in some examples, the differences in view angles may be limited to the difference within a horizontal plane regardless of the vertical positioning of the different people. In other examples, any difference in the relative vertical positioning of people may be included in the determination of view angle differences. In some examples, the position comparer 508 compares the difference in view angles to relevant thresholds to determine whether to group separate people together. Additionally or alternatively, the example position comparer 508 may determine differences in position between different ones of the people detected in the viewing area 100 independent of calculated view angles of the people. For example, the position comparer 508 may define differences in position between two people based on a distance between different ones of the people as represented within a two-dimensional rendering of the viewing area 100 captured by an image sensor associated with the one or more sensors 130. With the image sensor fixed in a known location relative to the display 102, such distances between two people may serve as a proxy for the difference in view angle between the two people. In some examples, the position comparer 508 compares such distances between the people to relevant thresholds to determine whether to group the people together.

In some examples, the view angles, the associated difference in view angles, the grouping of different people based on such differences, the distances between people, and/or the grouping of different people based on such distances are used by the content determiner 514 to determine what content to render via the display 102. More particularly, the example content determiner 514 determines whether different content may be rendered simultaneously for different view angles associated with the different people in the viewing area 100. Further, the content determiner 514 may determine the particular angles (or range of angles corresponding to a combined group of people) for which the different content is to be rendered so as to be viewed by the people within the viewing area 100. Further still, the content determiner 514 may determine whether the content rendered via the display 102 is to be rendered as a fully dynamic view that varies in an interactive manner with the position of one or more particular people, as a partially dynamic view that varies in an interactive manner for people but contains content similar to what is rendered for other adjacent people, or as a static view that includes the same content viewed by multiple different people. In some examples, the content identified by the content determiner 514 for rendering via the display 102 is stored in the example database 518.

The example context analyzer 510 analyzes sensor data to determine a context for the viewing area 100 and/or a context for the people within the viewing area 100. For example, the context analyzer 510 may analyzes images of the viewing area to determine the type of viewing area and/or an expected use for the viewing area (e.g., for meetings (e.g., includes a conference table and chairs), for relaxing (e.g., includes a couch), etc.). Additionally or alternatively, the context analyzer 510 may analyze images of the viewing area to identify objects that may obstruct a view of the display 102 and the associated locations within the viewing area for which the display 102 would be obstructed. Further, in some examples, the context analyzer 510 may determine an activity and/or behavior of people detected within the viewing area 100 (e.g., whether the people are sitting, standing, moving around, talking, dancing, etc.). In some examples, the context analyzer 510 may predict an amount of movement expected from people in the viewing area 100 based on the contextual analysis performed as outlined above and/or based on historical behavior data of the same or different people in the viewing area 100. In some examples, contextual determinations made by the context analyzer 510 are provided to the content determiner 514 to facilitate the determination of content to render via the display 102 and/or the angles at which different content may be rendered simultaneously.

The example user feedback analyzer 512 analyzes feedback from users of the display 102 to determine a level of satisfaction of the content identified for rendering by the content determiner and/or to determine whether adjustments to the rendered content are to be made. In some examples, the user feedback analyzer 512 is implemented in combination with the content determiner 514 to update or adjust content rendered via the display 102 in substantially real-time as people in the viewing area 100 provide feedback. In some examples, the user feedback analyzer 512 implements deep learning technology to improve the ability of the content determiner 514 over time to identify suitable content for people in any particular position within the viewing area 100.

The example timer 516 is used in combination with the example content determiner 514 to determine what content to render via the display 102 and when such content needs to be changed based on changes in the position and/or number of people in the viewing area 100. As a specific example, when a person changes position by turning away from the display 102, the content determiner 514 may initiate the timer 516. If the timer 516 exceeds a threshold period of time without the person turning back towards the display 102, the content determiner 514 may alter the content render to enhance the viewing experience of other people in the room without regard to the person no longer facing the display. Waiting until the threshold period of time has elapsed prevents the content from repeatedly changing at a relatively high frequency if a person repeatedly turns away from and then back towards the display 102.

While an example manner of implementing the example display controller 128 of FIGS. 1-4 is illustrated in FIG. 5, one or more of the elements, processes and/or devices illustrated in FIG. 5 may be combined, divided, re-arranged, omitted, eliminated and/or implemented in any other way. Further, the example communications interface 502, the example people detector 504, the example position analyzer 506, the example position comparer 508, the example context analyzer 510, the example user feedback analyzer 512, the example content determiner 514, the example timer 516, the example database 518, and/or, more generally, the example display controller 128 of FIGS. 1-5 may be implemented by hardware, software, firmware and/or any combination of hardware, software and/or firmware. Thus, for example, any of the example communications interface 502, the example people detector 504, the example position analyzer 506, the example position comparer 508, the example context analyzer 510, the example user feedback analyzer 512, the example content determiner 514, the example timer 516, the example database 518, and/or, more generally, the example display controller 128 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communications interface 502, the example people detector 504, the example position analyzer 506, the example position comparer 508, the example context analyzer 510, the example user feedback analyzer 512, the example content determiner 514, the example timer 516, and/or the example database 518 is/are hereby expressly defined to include a non-transitory computer readable storage device or storage disk such as a memory, a digital versatile disk (DVD), a compact disk (CD), a Blu-ray disk, etc. including the software and/or firmware. Further still, the example display controller 128 of FIGS. 1-4 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
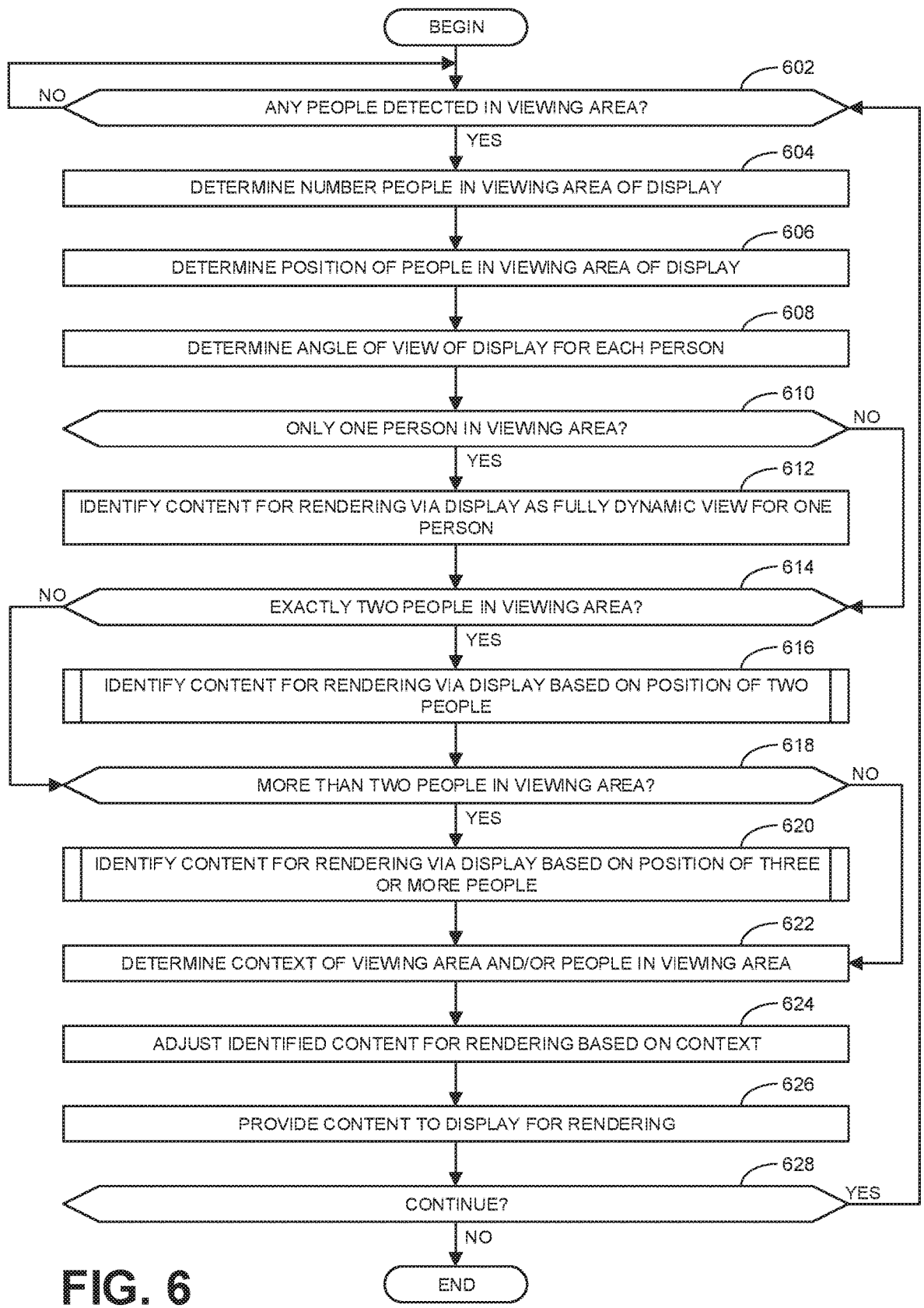
FIGS. 6-8 are flowcharts representative of example machine readable instructions that may be executed to implement the example display controller of FIGS. 1-5.
Figure 7:
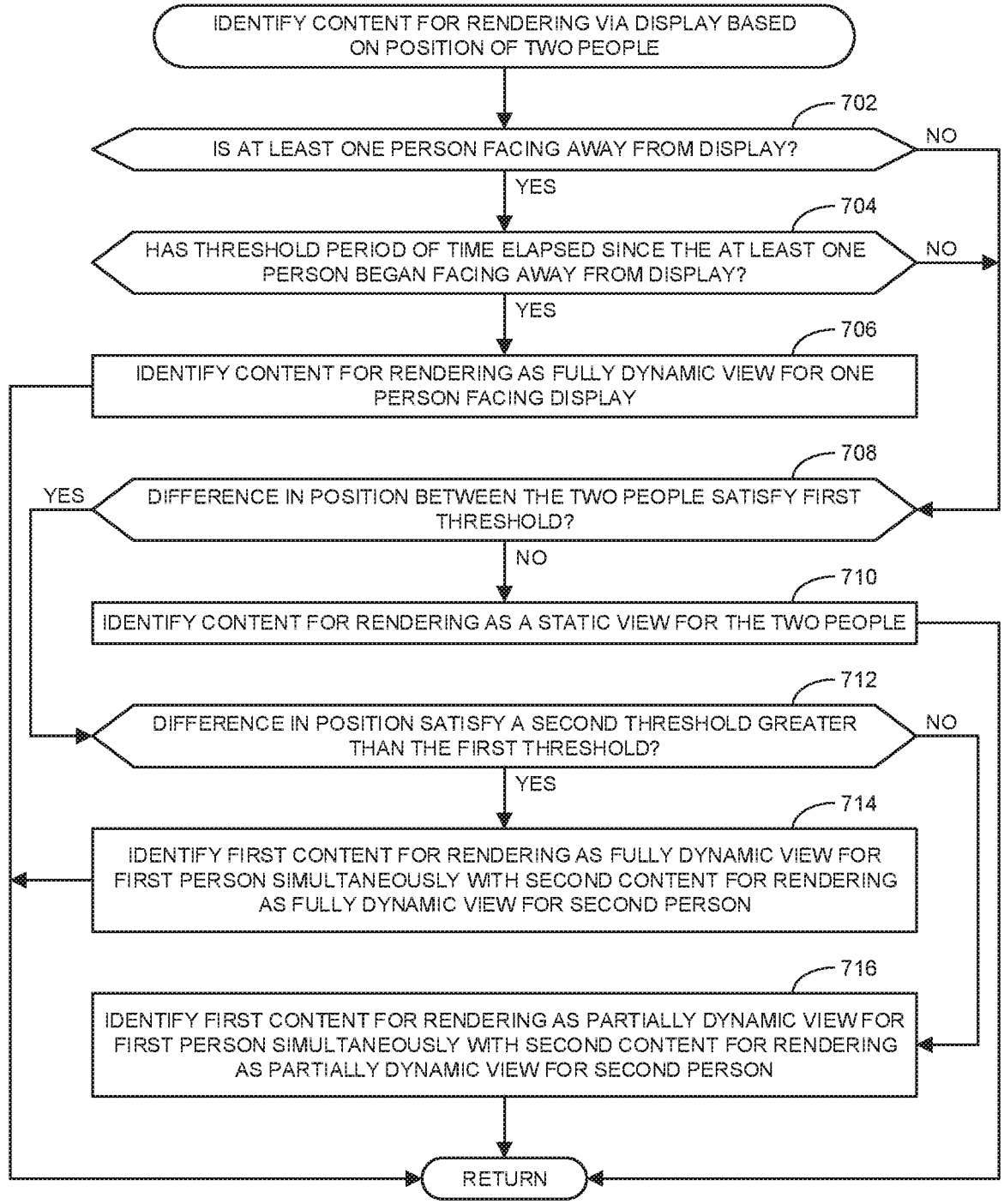
Figure 8:
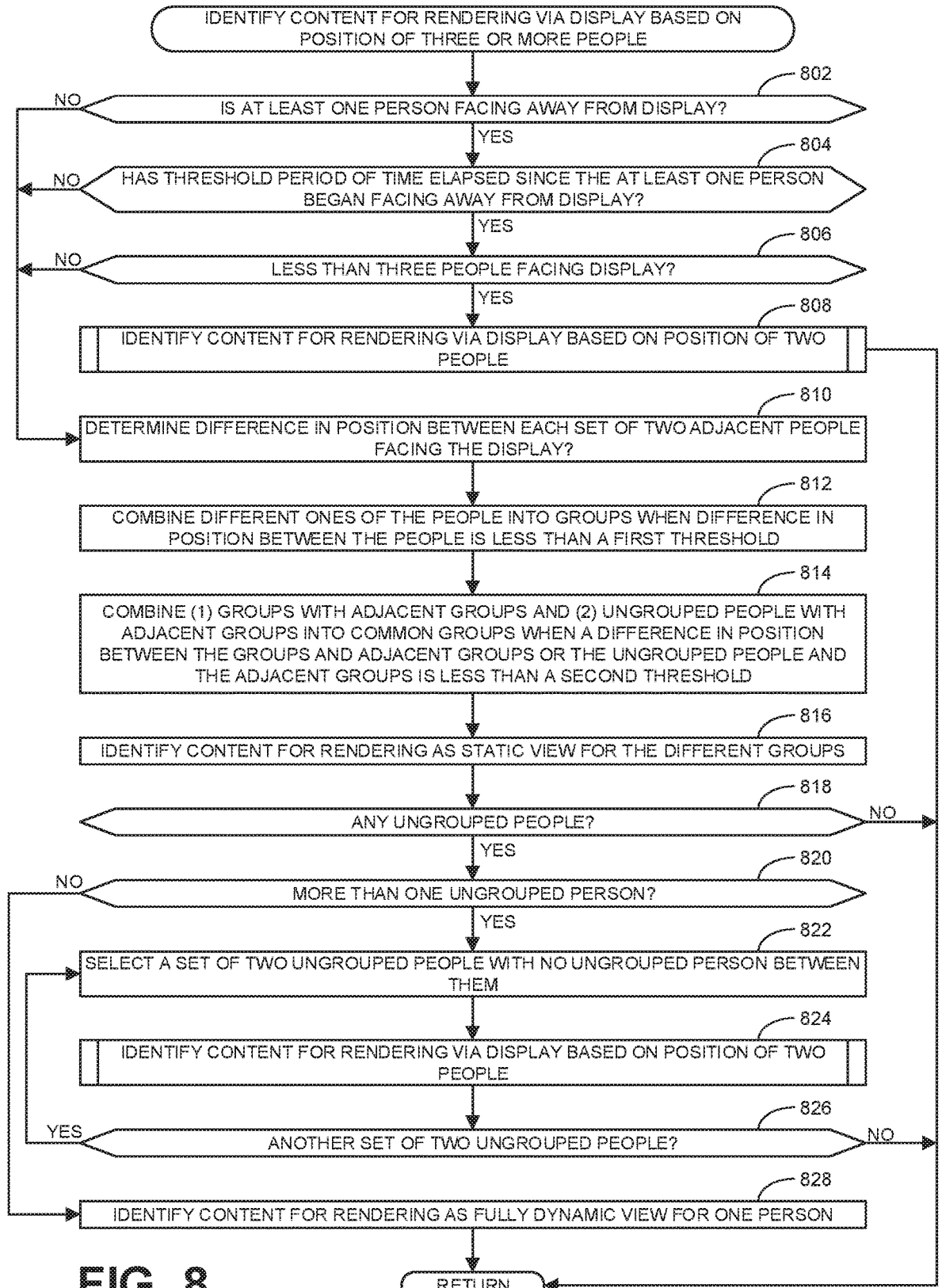

Flowcharts representative of example hardware logic, machine readable instructions, hardware implemented state machines, and/or any combination thereof for implementing the display controller 128 of FIGS. 1-5 is shown in FIGS. 6-8. The machine readable instructions may be an executable program or portion of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 6-8, many other methods of implementing the example display controller 128 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 6-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The program of FIG. 6 begins at block 602 where the example people detector 504 determines whether any people are detected in a viewing area (e.g., the viewing area 100 of FIGS. 1-4). If not, control remains at block 602. If at least one person is detected in the room, control advances to block 604 where the example people detector 504 determines the number of people in the viewing area 100. At block 606, the example position analyzer determines the position of the people in the viewing area 100. In some examples, the position of a person includes the location of the person within the viewing area 100 as well as the direction of their gaze. In some examples, the direction of gaze is based on eye-tracking technology. In other examples, the direction of gaze is based on the general direction that a person's head is facing without specifically tracking eye movements. At block 608, the example position comparer 508 determines the angle of view of a display (e.g., the display 102 of FIGS. 1-4) for each person.

At block 610, the example people detector determines whether there is only one person in the viewing area 100. If so, control advances to block 612 where the content determiner 514 identifies content for rendering via the display 102 as a fully dynamic view for the one person. Thereafter, control advances to block 614. If the example people detector determines, at block 610, that there is not only one person in the viewing area 100, control advances directly to block 614.

At block 614, the example people detector determines whether there are exactly two people in the viewing area 100. If so, control advances to block 616 where the content determiner 514 identifies content for rendering via the display 102 based on the position of the two people. Further detail regarding the implementation of block 616 is provided below in connection with FIG. 7. Thereafter, control advances to block 618. If the example people detector determines, at block 614, that there is not exactly two people in the viewing area 100, control advances directly to block 618.

At block 618, the example people detector determines whether there are more than two people in the viewing area 100. If so, control advances to block 620 where the content determiner 514 identifies content for rendering via the display 102 based on the position of the three or more people. Further detail regarding the implementation of block 620 is provided below in connection with FIG. 8. Thereafter, control advances to block 622. If the example people detector determines, at block 618, that there is not more than two people in the viewing area 100, control advances directly to block 622.

At block 622, the example context analyzer 510 determines a context of the viewing area 100 and/or the people in the viewing area 100. At block 624, the example content determiner 514 adjusts the identified content for rendering based on the context. At block 626, the example communications interface 502 provides the content to the display 102 for rendering. Thereafter, at block 628, the example display controller 128 determines whether to continue. If so, control returns to block 602. Otherwise, the example process of FIG. 6 ends.

FIG. 7 is a flowchart detailing an example implementation of block 616 of FIG. 6. The example process of FIG. 7 begins at block 702 where the example position analyzer 506 determines whether at least one person is facing away from the display 102. If so, control advances to block 704 where the example content determiner 514 determines whether a threshold period of time has elapsed since the at least one person began facing away from the display 102. If so, control advances to block 706 where the example content determiner 514 identifies content for rendering as a fully dynamic view for the one person facing the display 102. Thereafter, the process of FIG. 7 ends and returns to complete the process of FIG. 6. Returning to block 704, if the example content determiner 514 determines that the threshold period of time has not elapsed, control advances to block 708. Likewise, if the example position analyzer 506 determines, at block 702, that no people are facing away from the display 102, control advances to block 708.

At block 708, the example position comparer 508 determines whether a difference in position between the two people satisfies (e.g., is equal to or greater than) a first threshold. In some examples, the difference in position may be based on one or more of a difference in view angle between the two people or a distance between the two people. If the difference in position does not satisfy the first threshold, control advances to block 710 where the example content determiner 514 identifies content for rendering as a static view for the two people. Thereafter, the process of FIG. 7 ends and returns to complete the process of FIG. 6. Returning to block 708, if the example position comparer 508 determines that the difference in position between the two people does satisfy the first threshold, control advances to block 712.

At block 712, the example position comparer 508 determines whether the difference in position satisfies a second threshold greater than the first threshold. If so, control advances to block 714 where the example content determiner 514 identifies first content for rendering as a fully dynamic view for a first person simultaneously with second content for rendering as a fully dynamic view for a second person. Thereafter, the process of FIG. 7 ends and returns to complete the process of FIG. 6. If the example the example position comparer 508 determines, at block 712, that the difference in position does not satisfy the second threshold, control advances to block 716. At block 716, the example content determiner 514 identifies first content for rendering as a partially dynamic view for the first person simultaneously with second content for rendering as a partially dynamic view for the second person. Thereafter, the process of FIG. 7 ends and returns to complete the process of FIG. 6.

FIG. 8 is a flowchart detailing an example implementation of block 620 of FIG. 6. The example process of FIG. 8 begins at block 802 where the example position analyzer 506 determines whether at least one person is facing away from the display 102. If so, control advances to block 804 where the example content determiner 514 determines whether a threshold period of time has elapsed since the at least one person began facing away from the display 102. If so, control advances to block 806 where the position analyzer 506 determines whether less than three people are facing the display 102. If so, control advances to block 808 where the example content determiner 514 identifies content for rendering via the display based on the position of two people. An example implementation of block 808 is described above in connection with FIG. 7. Thereafter, the example process of FIG. 8 ends and returns to complete the process of FIG. 6. Returning to block 806, if the position analyzer 506 determines there is not less than three people facing the display 102, control advances directly to block 810. Similarly, if the example the example content determiner 514 determines, at block 804, that the threshold period of time has not elapsed, control advances directly to block 810. Likewise, if the example position analyzer 506 determines, at block 802, that no people are facing away from the display 102, control again advances directly to block 810.

At block 810, the example position comparer 508 determines the difference in position between each set of two adjacent people facing the display 102. At block 812, the example position comparer 508 combines different ones of the people into groups when the difference in position between the people is less than a first threshold. At block 814, the example position comparer 508 combines (1) groups with adjacent groups and (2) ungrouped people with adjacent groups into common groups when a difference in position between the groups and the adjacent groups or the ungrouped people and the adjacent groups is less than a second threshold. At block 816, the example content determiner 514 identifies content for rendering as a static view for the different groups. In some examples, if more than one group is identified, the static view of rendered content for one group may be different that the static view rendered for a different group. In other examples, the content determiner 514 may identify the same static view for all groups. If no group is identified (e.g., because the thresholds are small (or zero) and/or the people are sufficiently spaced apart), block 816 may be skipped.

At block 818, the example position comparer 508 determines whether there are any ungrouped people. If so, control advances to block 820 where the example position comparer 508 determines whether there is more than one ungrouped person. If so, control advances to block 822 where the example content determiner 514 selects a set of two ungrouped people with no ungrouped person between them. In some examples, the set of two people may have a group of people between them but not an ungrouped individual. At block 824, the example content determiner 514 identifies content for rendering via the display based on the position of the two people. An example implementation of block 808 is described above in connection with FIG. 7. Thereafter, control advances to block 826 where the example content determiner 514 determines whether there is another set of two ungrouped people. If so, control returns to block 822. Otherwise, the example process of FIG. 8 ends and returns to complete the process of FIG. 6.

Returning to block 820, if the example position comparer 508 determines that there is not more than one ungrouped person, control advances to block 828 where the example content determiner 514 identifies content for rendering as a fully dynamic view for the one person. Thereafter, the example process of FIG. 8 ends and returns to complete the process of FIG. 6. Returning to block 818, if the example position comparer 508 determines that there are no ungrouped people, the example process of FIG. 8 ends and returns to complete the process of FIG. 6.

Figure 9:
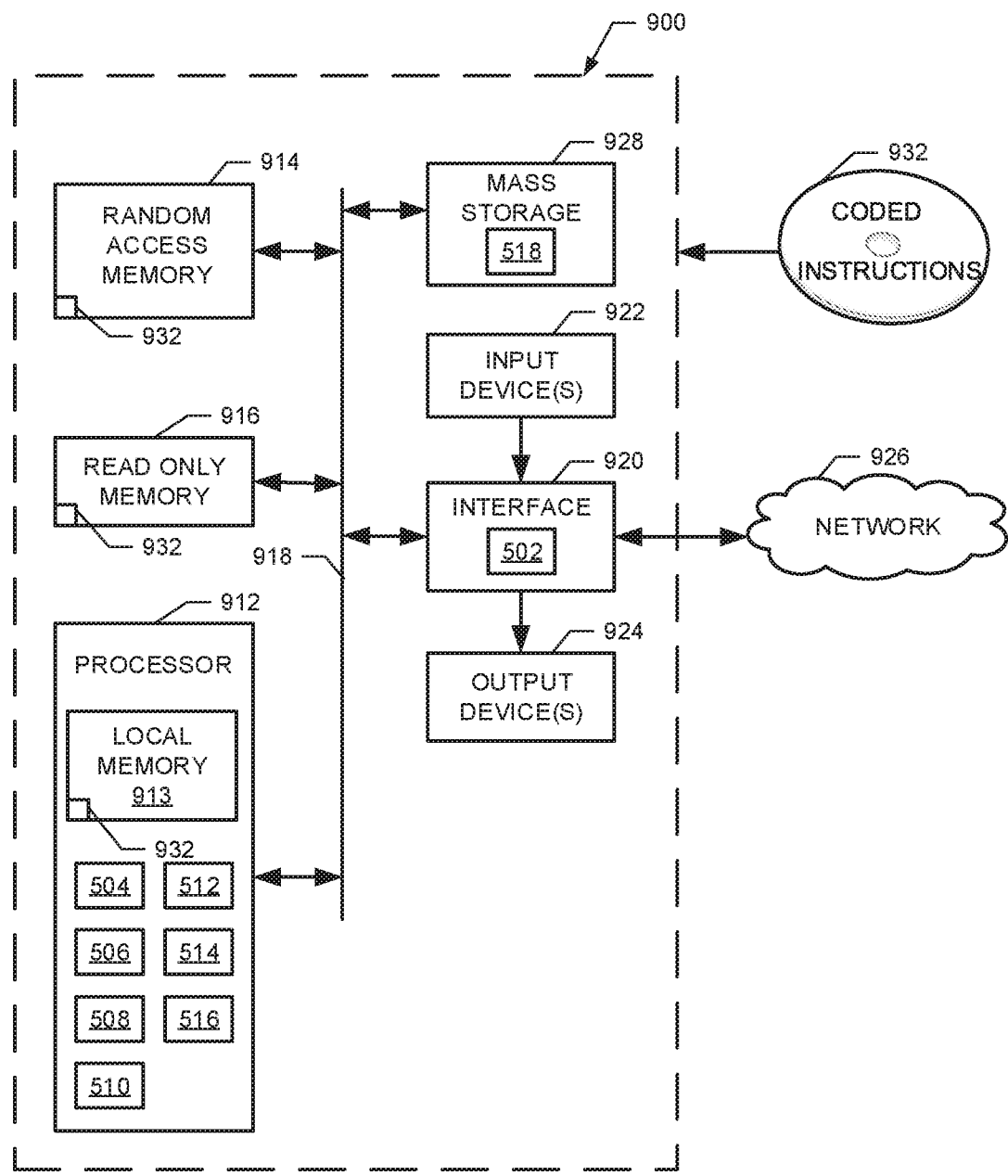
FIG. 9 is a block diagram of an example processing platform structured to execute the instructions of FIG. 6-8 to implement the example display controller of FIGS. 1-5.

FIG. 9 is a block diagram of an example processor platform 900 structured to execute the instructions of FIGS. 6-8 to implement the example display controller 128 of FIGS. 1-5. The processor platform 900 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example people detector 504, the example position analyzer 506, the example position comparer 508, the example context analyzer 510, the example user feedback analyzer 512, the example content determiner 514, and the example timer 516.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface. In this example, the interface circuit 920 implements the example communications interface 502.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives. In this example, the mass storage device 928 implements the example database 518.

The machine executable instructions 932 of FIGS. 6-8 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that enable the implementation of multi-view displays capable of simultaneously rendering different content for different viewers located at different view angles relative to the display. More particularly, examples disclosed herein enable the automatic selection and updating of content rendered via a multi-view display based on changes in the number and/or position of people in the viewing area of a multi-view display to enhance the viewing experience of all people present. Specifically, examples disclosed herein may identify a static view, a partially dynamic view, or a fully dynamic view of rendered content based on whether the view angles of the display by different people in the viewing area (or other measurements of a difference of position between the people) satisfy one or more thresholds. Further, examples disclosed herein implement a contextual analysis to determine the particular circumstances associated with the viewing area and/or the people in the viewing area to uniquely adapt the content rendered via the display to the particular circumstances.

Example 1 includes an apparatus comprising a position analyzer to determine a first location of a first person relative to a display screen, and determine a second location of a second person relative to the display screen, a position comparer to determine a difference in position between the first person and the second person based on the first and second locations, and a content determiner to identify first content to display to the first person and second content to display to the second person when the difference satisfies a threshold, the first content being different than the second content, the first and second content to be rendered simultaneously via the display screen, and identify third content to display to both the first person and the second person via the display screen when the difference does not satisfy the threshold.

Example 2 includes the apparatus as defined in example 1, wherein the difference in position is defined by a difference in view angle of the display screen between the first person and the second person.

Example 3 includes the apparatus as defined in example 1, wherein the difference in position is defined by a distance between the first person and the second person.

Example 4 includes the apparatus as defined in example 1, wherein the position analyzer is to track movement of the first person relative to the display screen, and the content determiner is to dynamically update the first content to display based on the movement of the first person.

Example 5 includes the apparatus as defined in example 1, wherein the content determiner is to switch between identifying (1) the first and second content and (2) the third content to display based on a change in the difference in the position at a first point in time.

Example 6 includes the apparatus as defined in example 5, wherein the content determiner is to delay subsequent switching between the identifying (1) the first and second content and (2) the third content to display a threshold period of time after the first point in time regardless of changes to the difference in the position.

Example 7 includes the apparatus as defined in example 1, wherein the difference in position is a first difference in position, the position analyzer to determine a third location of a third person relative to the display screen and to determine whether the third person is facing the display screen, the content determiner to identify (1) the first content and the second content or (2) the third content to display based on the first difference regardless of the third location when the third person is facing away from the display screen, and identify (1) the first content and the second content or (2) the third content to display based on at least one of a second difference in position between the first person and the third person or a third difference in position between the second person and the third person when the third person is facing the display screen.

Example 8 includes the apparatus as defined in example 7, wherein, when the third person is facing the display screen, the position comparer is to group the third person with the first person when the second difference does not satisfy the threshold, and the content determiner is to identify the first content for the first and third persons and the second content for the second person when the lesser of the first difference and the third difference satisfies the threshold, and identify the third content for the first, second, and third persons when the lesser of the first difference and the third difference does not satisfy the threshold.

Example 9 includes the apparatus as defined in example 7, wherein the content determiner is to delay a change to content to display for a threshold period of time after the third person begins facing away from the display screen.

Example 10 includes the apparatus as defined in example 1, wherein an amount of difference between the first content and the second content varies based on the difference in the position.

Example 11 includes the apparatus as defined in example 1, wherein the threshold is a first threshold, the first content to be similar to the second content when the difference in the position does not satisfy a second threshold greater than the first threshold, the first content to be independent of the second content when the difference in the position satisfies the second threshold.

Example 12 includes the apparatus as defined in example 1, wherein the third content corresponds to the first content.

Example 13 includes the apparatus as defined in example 1, wherein the third content is different than the first content and different than the second content.

Example 14 includes the apparatus as defined in example 1, wherein the first content is to mimic a view of a scene viewed through a window from the perspective of the first person, and the second content is to mimic a view of the scene viewed through the window from the perspective of the second person.

Example 15 includes the apparatus as defined in example 1, further including a context analyzer to determine a context associated with a viewing area of the display screen, the content determiner to identify at least one of the first content, the second content, or the third content to display based on the context.

Example 16 includes a non-transitory computer readable medium comprising instructions that, when executed causes a machine to at least determine a first location of a first person relative to a display screen, determine a second location of a second person relative to at least one of the display screen or the first location, determine a difference in position between the first person and the second person based on the first and second locations, identify first content to display via the display screen to the first person and second content to display via the display screen to the second person when the difference satisfies a threshold, the first content being different than the second content, the first and second content to be rendered simultaneously, and identify third content to display to both the first person and the second person when the difference does not satisfy the threshold.

Example 17 includes the non-transitory computer readable medium as defined in example 16, wherein the difference in position is defined by a difference in view angle of the display screen between the first person and the second person.

Example 18 includes the non-transitory computer readable medium as defined in example 16, wherein the difference in position is defined by a distance between the first person and the second person.

Example 19 includes the non-transitory computer readable medium as defined in example 16, wherein the instructions further cause the machine to track movement of the first person, and dynamically update the first content to display based on the movement of the first person.

Example 20 includes the non-transitory computer readable medium as defined in example 16, wherein the instructions further cause the machine to switch between identifying (1) the first and second content and (2) the third content based on a change in the difference in the position at a first point in time.

Example 21 includes the non-transitory computer readable medium as defined in example 20, wherein the instructions further cause the machine to delay subsequent switching between identifying (1) the first and second content and (2) the third content a threshold period of time after the first point in time regardless of changes to the difference in the position.

Example 22 includes the non-transitory computer readable medium as defined in example 16, wherein the difference in the position is a first difference in the position, the instructions further causing the machine to determine a third location of a third person relative to the display screen, determine whether the third person is facing the display screen, identify (1) the first content and the second content or (2) the third content based on the first difference regardless of the third location when the third person is facing away from the display screen, and identify (1) the first content and the second content or (2) the third content based on at least one of a second difference in the position between the first person and the third person or a third difference in the position between the second person and the third person when the third person is facing the display screen.

Example 23 includes the non-transitory computer readable medium as defined in example 22, wherein the instructions further cause the machine to group the third person with the first person when the second difference does not satisfy the threshold, and when the third person is facing the display screen identify the first content for the first and third persons and the second content for the second person when the lesser of the first difference and the third difference satisfies the threshold, and identify the third content for the first, second, and third persons when the lesser of the first difference and the third difference does not satisfy the threshold.

Example 24 includes the non-transitory computer readable medium as defined in example 22, wherein the instructions further cause the machine to delay a change to content to display for a threshold period of time after the third person begins facing away from the display screen.

Example 25 includes the non-transitory computer readable medium as defined in example 16, wherein an amount of difference between the first content and the second content varies based on the difference in position.

Example 26 includes the non-transitory computer readable medium as defined in example 16, wherein the threshold is a first threshold, the first content to be similar to the second content when the difference in position does not satisfy a second threshold greater than the first threshold, the first content to be independent of the second content when the difference in position satisfies the second threshold.

Example 27 includes the non-transitory computer readable medium as defined in example 16, wherein the third content corresponds to the first content.

Example 28 includes the non-transitory computer readable medium as defined in example 16, wherein the third content is different than the first content and different than the second content.

Example 29 includes the non-transitory computer readable medium as defined in example 16, wherein the first content mimics a view of a scene through a window from the perspective of the first person, and the second content mimics a view of the scene through the window from the perspective of the second person.

Example 30 includes the non-transitory computer readable medium as defined in example 16, wherein the instructions further cause the machine to determine a context associated with a viewing area of the display screen, and identify at least one of the first content, the second content, or the third content based on the context.

Example 31 includes a method comprising determining, by executed an instruction with a processor, a first location of a first person relative to a display screen, determining, by executed an instruction with the processor, a second location of a second person relative to the display screen, determining, by executed an instruction with the processor, a difference in position between the first person and the second person based on the first and second locations, identifying, by executed an instruction with the processor, first content to display to the first person and second content to display to the second person when the difference satisfies a threshold, the first content being different than the second content, the first and second content to be rendered simultaneously via the display screen, and identifying, by executed an instruction with the processor, third content to display to both the first person and the second person when the difference does not satisfy the threshold.

Example 32 includes the method as defined in example 31, wherein the difference in position is defined by a difference in view angle of the display screen between the first person and the second person.

Example 33 includes the method as defined in example 31, wherein the difference in position is defined by a distance between the first person and the second person.

Example 34 includes the method as defined in example 31, further including tracking movement of the first person, and dynamically updating the first content to display based on the movement of the first person.

Example 35 includes the method as defined in example 31, further including switching between identifying (1) the first and second content to display and (2) the third content to display based on a change in the difference in the position at a first point in time.

Example 36 includes the method as defined in example 35, further including delaying subsequent switching between identifying (1) the first and second content to display and (2) the third content to display a threshold period of time after the first point in time regardless of changes to the difference in the position.

Example 37 includes the method as defined in example 31, wherein the difference in the position is a first difference in the position, the method further including determining a third location of a third person relative to the display screen, determining whether the third person is facing the display screen, identifying (1) the first content and the second content or (2) the third content to display based on the first difference regardless of the third location when the third person is facing away from the display screen, and identifying (1) the first content and the second content to display or (2) the third content to display based on at least one of a second difference in the position between the first person and the third person or a third difference in the position between the second person and the third person when the third person is facing the display screen.

Example 38 includes the method as defined in example 37, further including grouping the third person with the first person when the second difference does not satisfy the threshold, and when the third person is facing the display screen identifying the first content for the first and third persons and the second content for the second person when the lesser of the first difference and the third difference satisfies the threshold, and identifying the third content for the first, second, and third persons when the lesser of the first difference and the third difference does not satisfy the threshold.

Example 39 includes the method as defined in example 37, further including delaying a change to content to display for a threshold period of time after the third person begins facing away from the display screen.

Example 40 includes the method as defined in example 31, wherein an amount of difference between the first content and the second content varies based on the difference in the position.

Example 41 includes the method as defined in example 31, wherein the threshold is a first threshold, the first content to be similar to the second content when the difference in the position does not satisfy a second threshold greater than the first threshold, the first content to be independent of the second content when the difference in position satisfies the second threshold.

Example 42 includes the method as defined in example 31, wherein the third content corresponds to the first content.

Example 43 includes the method as defined in example 31, wherein the third content is different than the first content and different than the second content.

Example 44 includes the method as defined in example 31, wherein the first content mimics a view of a scene through a window from the perspective of the first person, and the second content mimics a view of the scene through the window from the perspective of the second person.

Example 45 includes the method as defined in example 31, further including determining a context associated with a viewing area of the display screen, and identifying at least one of the first content, the second content, or the third content to display based on the context.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a position analyzer to:
   determine a first location of a first person relative to a display screen; and
   determine a second location of a second person relative to the display screen;
a position comparer to:
   determine, based on the first and second locations, at least one of (1) a difference in view angle of the display screen between the first person and the second person or (2) a distance between the first person and the second person; and
   compare the at least one of the difference in view angle or the distance to a threshold; and
a content determiner to:
   identify first content to display to the first person and second content to display to the second person when the at least one of the difference in view angle or the distance satisfies the threshold, the first and second content to be rendered simultaneously via the display screen, the first content including a first view of a first scene, the second content including a second view of a second scene, the first view being different than the second view; and
   when the at least one of the difference in view angle or the distance satisfies the threshold, dynamically update the first view of the first scene of the first content in response to movement of the first person relative to the display screen; and
   identify third content to display to both the first person and the second person via the display screen when the at least one of the difference in view angle or the distance does not satisfy the threshold.

2. The apparatus as defined in claim 1, wherein the content determiner is to switch between (1) identifying the first and second content and (2) identifying the third content based on a change in the at least one of the difference in view angle or the distance at a first point in time.

3. The apparatus as defined in claim 2, wherein the content determiner is to delay subsequent switching between (1) the identifying of the first and second content and (2) the identifying of the third content for a threshold period of time after the first point in time regardless of changes to the at least one of the difference in view angle or the distance.

4. The apparatus as defined in claim 1, wherein the at least one of the difference in view angle or the distance is a first difference in position between the first person and the second person, the position analyzer to determine a third location of a third person relative to the display screen and to determine whether the third person is facing the display screen, the content determiner to:
   identify either (1) the first content and the second content or (2) the third content based on the first difference in position regardless of the third location when the third person is facing away from the display screen; and
   identify either (1) the first content and the second content or (2) the third content based on at least one of a second difference in position between the first person and the third person or a third difference in position between the second person and the third person when the third person is facing the display screen.

5. The apparatus as defined in claim 4, wherein, when the third person is facing the display screen, the position comparer is to group the third person with the first person when the second difference in position does not satisfy the threshold, and the content determiner is to:
   identify the first content for the first and third persons and the second content for the second person when the lesser of the first difference in position and the third difference in position satisfies the threshold; and
   identify the third content for the first, second, and third persons when the lesser of the first difference in position and the third difference in position does not satisfy the threshold.

6. The apparatus as defined in claim 4, wherein the content determiner is to delay a change to content to display for a threshold period of time after the third person begins facing away from the display screen.

7. The apparatus as defined in claim 1, wherein an amount of difference between the first content and the second content varies based on the at least one of the difference in view angle or the distance.

8. The apparatus as defined in claim 1, wherein the threshold is a first threshold, the first content to be similar to the second content when the at least one of the difference in view angle or the distance does not satisfy a second threshold greater than the first threshold, the first content to be independent of the second content when the at least one of the difference in view angle or the distance satisfies the second threshold.

9. The apparatus as defined in claim 1, wherein the first and second scenes correspond to a same scene, the first view of the first scene is to mimic a first view of an exterior area through a window from a perspective of the first person, and the second view is to mimic a second view of the exterior area through the window from a perspective of the second person.

10. The apparatus as defined in claim 1, further including a context analyzer to determine a context associated with a viewing area of the display screen, the content determiner to identify at least one of the first content, the second content, or the third content to display based on the context.

11. The apparatus of claim 1, wherein the first and second scenes correspond to a same scene.

12. The apparatus of claim 11, wherein the first and second views include an overlapping portion of the same scene, the first view includes a first portion of the same scene not included in the second view, and the second view includes a second portion of the same scene not included in the first view.

13. The apparatus of claim 1, wherein, when the at least one of the difference in view angle or the distance satisfies the threshold, the content determiner is to dynamically update the second view of the second scene of the second content in response to movement of the second person relative to the display screen, the second view dynamically updated independent of the dynamic updating of the first view.

14. A non-transitory computer readable medium comprising instructions that, when executed, cause a machine to at least:
   determine a first location of a first person relative to a display screen;
   determine a second location of a second person relative to at least one of the display screen or the first location;
   determine, based on the first and second locations, at least one of (1) a difference in view angle of the display screen between the first person and the second person or (2) a distance between the first person and the second person;
   compare the at least one of the difference in view angle or the distance to a threshold;

when the at least one of the difference in view angle or the distance satisfies the threshold:
identify first content to display via the display screen to the first person and second content to display via the display screen to the second person, the first and second content to be rendered simultaneously, the first content including a first view of a first scene, the second content including a second view of a second scene, the first view being different than the second view; and
dynamically update the first view of the first scene of the first content in response to movement of the first person relative to the display screen; and
when the at least one of the difference in view angle or the distance does not satisfy the threshold, identify third content to display to both the first person and the second person.

15. The non-transitory computer readable medium as defined in claim 14, wherein the instructions further cause the machine to switch between (1) identifying the first and second content and (2) identifying the third content based on a change in the at least one of the difference in view angle or the distance at a first point in time.

16. The non-transitory computer readable medium as defined in claim 15, wherein the instructions further cause the machine to delay subsequent switching between (1) identifying the first and second content and (2) identifying the third content a threshold period of time after the first point in time regardless of changes to the at least one of the difference in view angle or the distance.

17. The non-transitory computer readable medium as defined in claim 14, wherein the at least one of the difference in view angle or the distance is a first difference in position between the first person and the second person, the instructions further causing the machine to:
determine a third location of a third person relative to the display screen;
determine whether the third person is facing the display screen;
identify either (1) the first content and the second content or (2) the third content based on the first difference in position regardless of the third location when the third person is facing away from the display screen; and
identify either (1) the first content and the second content or (2) the third content based on at least one of a second difference in position between the first person and the third person or a third difference in position between the second person and the third person when the third person is facing the display screen.

18. The non-transitory computer readable medium as defined in claim 17, wherein the instructions further cause the machine to:
group the third person with the first person when the second difference in position does not satisfy the threshold; and
when the third person is facing the display screen:
identify the first content for the first and third persons and the second content for the second person when the lesser of the first difference in position and the third difference in position satisfies the threshold; and
identify the third content for the first, second, and third persons when the lesser of the first difference in position and the third difference in position does not satisfy the threshold.

19. The non-transitory computer readable medium as defined in claim 14, wherein the threshold is a first threshold, the first content to be similar to the second content when the at least one of the difference in view angle or the distance does not satisfy a second threshold greater than the first threshold, the first content to be independent of the second content when the at least one of the difference in view angle or the distance satisfies the second threshold.

20. A method comprising:
determining, by executed an instruction with a processor, a first location of a first person relative to a display screen;
determining, by executed an instruction with the processor, a second location of a second person relative to the display screen;
determining, by executed an instruction with the processor, based on the first and second locations, at least one of (1) a difference in view angle of the display screen between the first person and the second person or (2) a distance between the first person and the second person;
comparing, by executing an instruction with the processor, the at least one of the difference in view angle or the distance to a threshold;
when the at least one of the difference in view angle or the distance satisfies the threshold:
identifying, by executed an instruction with the processor, first content to display to the first person and second content to display to the second person, the first and second content to be rendered simultaneously via the display screen, the first content including a first view of a first scene, the second content including a second view of a second scene, the first view being different than the second view; and
dynamically updating the first view of the first scene of the first content in response to movement of the first person relative to the display screen; and
when the at least one of the difference in view angle or the distance does not satisfy the threshold, identifying, by executed an instruction with the processor, third content to display to both the first person and the second person.

21. The method as defined in claim 20, further including switching between (1) identifying the first and second content and (2) identifying the third content based on a change in the at least one of the difference in view angle or the distance at a first point in time.

22. The method as defined in claim 20, wherein the at least one of the difference in view angle or the distance is a first difference in position between the first person and the second person, the method further including:
determining a third location of a third person relative to the display screen;
determining whether the third person is facing the display screen;
identifying either (1) the first content and the second content or (2) the third content based on the first difference in position regardless of the third location when the third person is facing away from the display screen; and
identifying either (1) the first content and the second content or (2) the third content based on at least one of a second difference in position between the first person and the third person or a third difference in position between the second person and the third person when the third person is facing the display screen.

23. The method as defined in claim 22, further including:
grouping the third person with the first person when the second difference in position does not satisfy the threshold; and
when the third person is facing the display screen:
identifying the first content for the first and third persons and the second content for the second person when the lesser of the first difference in position and the third difference in position satisfies the threshold; and
identifying the third content for the first, second, and third persons when the lesser of the first difference in position and the third difference in position does not satisfy the threshold.

24. The method as defined in claim 20, wherein the threshold is a first threshold, the first content to be similar to the second content when the at least one of the difference in view angle or the distance does not satisfy a second threshold greater than the first threshold, the first content to be independent of the second content when the at least one of the difference in view angle or the distance satisfies the second threshold.

* * * * *